Feb. 20, 1923.
G. F. CAREY.
AUTO SAFETY DEVICE.
FILED JUNE 1, 1921.
1,445,750.
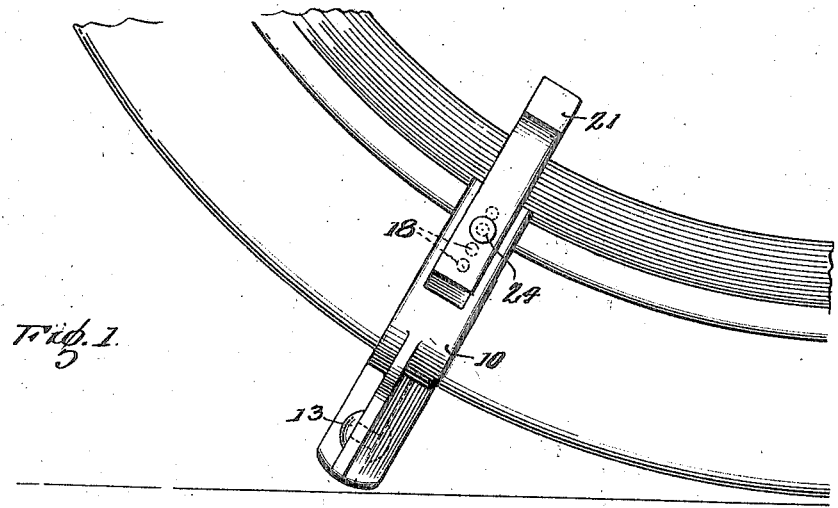
Fig. 1.
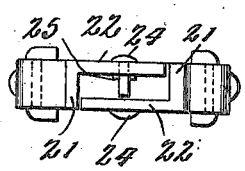
Fig. 3.
Fig. 2.
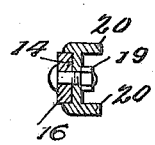
Fig. 4.
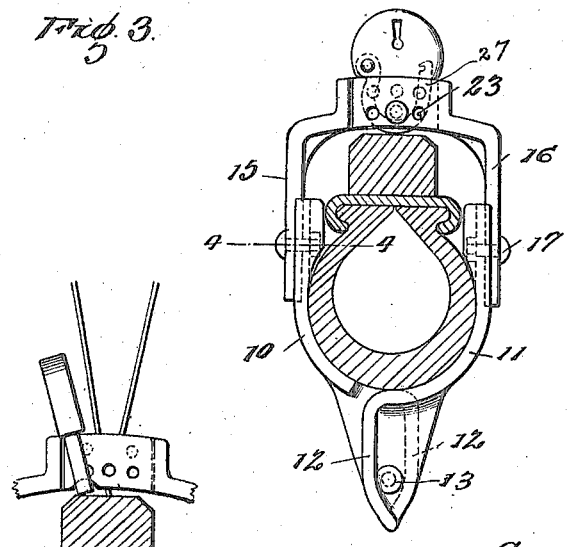
Fig. 5.
George F. Carey
INVENTOR
BY ATTORNEY Patented Feb. 20, 1923.

1,445,750

UNITED STATES PATENT OFFICE.

GEORGE F. CAREY, OF NEW YORK, N. Y.

AUTO SAFETY DEVICE.

Application filed June 1, 1921. Serial No. 474,219.

*To all whom it may concern:*

Be it known that I, GEORGE F. CAREY, a citizen of the United States, residing at New York, in the county of New York and State of New York, have invented certain new and useful Improvements in Auto Safety Devices, of which the following is a specification.

This invention has relation to protective devices for automobiles, and has for an object to provide a device adapted to be applied to the vehicle wheel and to project beyond the tire so as to form an obstruction to the rotation of the wheel which will cause the automobile to rise and fall during its travel, thus indicating to observers by its erratic course that it is being operated by unauthorized persons.

Another object of the invention is to provide a device of this character with improvements by virtue of which the device may be applied to tires of various diameters and sizes by adjusting the parts relatively.

In addition to the foregoing this invention comprehends improvements in the details of construction and arrangement of parts, to be hereinafter set forth and particularly pointed out in the appended claims.

In the accompanying drawings in which similar and corresponding parts are designated by the same characters of reference, throughout the several views in which they appear, Figure 1 is a view in side elevation of my improved device applied to a wheel.

Figure 2 is a view of the tire in cross section showing the application of the device, the latter being shown in front elevation.

Figure 3 is a view of the device in top plan, and

Figure 4 is a detail view in section taken on the line 4—4 of Figure 2.

Figure 5 is a detail view of a modified manner of locking the parts together.

With reference to the drawings, 10 and 11 indicate a pair of relatively movable jaws, each being curved to partly encircle a tire casing, and each having an extension 12, the latter being one half as wide as the jaws, so that the extensions may overlap and thus connect the jaws for movement in the same plane. A bolt, rivet or the like 13 connects the extensions as shown. The free end of each jaw is formed with a groove 14 in one face to receive one end of an extension, of which a pair are provided as shown at 15 and 16. Each extension has an opening for a bolt 17 to enter, said bolt also entering one of a plurality of openings 18 formed in the free terminal of each jaw. A nut 19 is applied to the projecting end of each bolt and guard flanges 20 are formed upon the inner faces of the jaws to prevent access to these nuts when the device is applied to a tire. The opposite end of each extension 15 and 16 is bent at right angles and said bent portions directed toward each other. Said ends are each provided with an upstanding flange 21 and each of said flanges 21 are formed with a flange 22, the latter being formed at opposite edges of the flanges 21 so that said flanges 22 may overlap in spaced relation when the ends of the extensions are brought toward each other. Said flanges 21 and 22 of both extensions thus form a rectangular recess. Each flange 22 is formed with a series of openings 23, the series of one flange being displaced vertically relative to those of the other flange. A pair of bolts 24 are provided, one being inserted in an opening 23 of one flange and the other in a correspondingly placed opening of the other flange. The bolts will thus be contiguous. Cotter pins 25 may be inserted in the bolts to prevent their withdrawal. A lock of conventional type is now employed, preferably of the padlock type, as shown at 26. The shackle 27 is embraced about both of the bolts 24 and the jaws will thus be locked against separation.

In practise the jaws are encompassed about a tire casing as shown in Figure 2 and the outer ends of the extensions 15 and 16 locked together in the manner stated. With the portions 12 extending radially from the tire casing it will be seen that an obstruction is provided which will interfere with the orderly progression of the vehicle, resulting in a loss of speed and probably some slight damage which will not destroy the vehicle but only render it temporarily useless. It will be noted that by means of this construction the device may be altered to embrace tires of various cross sectional diameters, since the extensions 15 and 16 may be moved outward thus lengthening the jaws, and the bolts 24 may be reset to permit the extensions to be locked in a more widely separated relation.

While I have illustrated and described my invention with some degree of particularity I realize that in practise various alterations therein may be made. I therefore reserve the right and privilege of changing the form of the details of construction or otherwise changing the arrangement of the correlated parts, without departing from the spirit of the invention or the scope of the appended claims.

Having thus described my invention what I claim as new and desire to secure by United States Letters Patent is:

1. A protective device including a pair of jaws to encircle a tire casing, integral overlapping extensions thereon, means to pivot said extensions together, a second extension for the free end of each jaw, means to connect the extensions to the jaws for lateral adjustment relative thereto, and means to lock said extensions together.

2. A protective device including a pair of jaws pivoted together for relative movement, an extension for each jaw adjustably connected thereto, a flange on each extension whereby said flanges are in overlapping and spaced relation when the extensions are brought together, a bolt mounted in each flange, and a lock to embrace both bolts to lock the extensions together.

3. A protective device including a pair of jaws pivoted together for relative movement, the upper free ends of said jaws having vertical grooves therein, adjustable extensions provided with apertures therethrough seated in said grooves, inwardly disposed overlapping flanges formed with each extension, contiguous bolts extending through apertures in the overlapping flanges, and locking means cooperating with said flanges permitting lateral adjustment of the jaws.

In testimony whereof I affix my signature.

GEORGE F. CAREY. [L. S.]